(12) United States Patent
Shin et al.

(10) Patent No.: US 9,656,584 B2
(45) Date of Patent: May 23, 2017

(54) ASSIST HANDLE FOR VEHICLE

(71) Applicants: Hyundai Motor Company, Seoul (KR); Kia Motors Corporation, Seoul (KR); TRW Controls & Fasteners Inc., Incheon (KR)

(72) Inventors: Han Shin, Seoul (KR); Sung Mo Lee, Seoul (KR); Sang Eun Jang, Yesan-gun (KR); Kyoung Sub Jun, Incheon (KR)

(73) Assignees: Hyundai Motor Company, Seoul (KR); Kia Motors Corporation, Seoul (KR); TRW Controls & Fasteners Inc., Incheon (KR)

( * ) Notice: Subject to any disclaimer, the term of this patent is extended or adjusted under 35 U.S.C. 154(b) by 332 days.

(21) Appl. No.: 14/329,604

(22) Filed: Jul. 11, 2014

(65) Prior Publication Data

US 2015/0021933 A1   Jan. 22, 2015

(30) Foreign Application Priority Data

Jul. 17, 2013   (KR) .......................... 10-2013-0084392

(51) Int. Cl.
*E05B 3/00* (2006.01)
*B60N 3/02* (2006.01)
(Continued)

(52) U.S. Cl.
CPC ............ *B60N 3/023* (2013.01); *E05B 17/041* (2013.01); *E05B 77/42* (2013.01); *Y10T 292/57* (2015.04)

(58) Field of Classification Search
CPC ......... B60N 3/02; B60N 3/023; E05B 17/041; E05B 77/42

USPC .................. 292/336.3; 16/438, 444–446
See application file for complete search history.

(56) References Cited

U.S. PATENT DOCUMENTS 3,153,552 A * 10/1964 Sandor .................... E05B 85/14
  292/336.3
4,482,179 A * 11/1984 Johnson ................ E05B 1/0038
  292/336.3

(Continued)

FOREIGN PATENT DOCUMENTS

DE       3513293       * 10/1986
DE       4125184 A1 *  2/1993  ............ B60J 3/0213
(Continued)

*Primary Examiner* — Carlos Lugo
(74) *Attorney, Agent, or Firm* — Morgan Lewis & Bockius LLP

(57) ABSTRACT

An assist handle apparatus for a vehicle having a mounting plate positioned at a handgrip may include a damping mechanism having a hinge pin connected to the handgrip; hinge ends positioned at first and second sides of the mounting plate, wherein a damper seat is formed in a space defined between the hinge ends; a damper that is inserted in the damper seat with the hinge pin passing through the damper and the hinge ends, the damper having first and second damping ends protruding at a first side and a second side of an outer circumference of the damper respectively; and a stopper that is formed on an inner side of a hinge portion of the handgrip, wherein the stopper damps rotation shock in both rotation directions of the handgrip when the stopper selectively contacts with the first damping end or the second damping end according to rotation of the handgrip.

4 Claims, 4 Drawing Sheets

(51) Int. Cl.
    *H01M 2/10*         (2006.01)
    *E05B 77/42*        (2014.01)
    *E05B 17/04*        (2006.01)

(56) References Cited

U.S. PATENT DOCUMENTS

| | | | | |
|---|---|---|---|---|
| 5,210,905 | A * | 5/1993 | Dietz | B60N 3/023 16/402 |
| 6,397,435 | B1 * | 6/2002 | Gosselet | B60N 3/023 16/438 |
| 6,467,130 | B2 * | 10/2002 | Kurachi | B60N 3/023 16/418 |
| 6,594,864 | B2 * | 7/2003 | Epp | B60J 3/0265 16/280 |
| 6,643,897 | B2 * | 11/2003 | Chang | B60N 3/023 16/248 |
| 7,677,614 | B2 * | 3/2010 | Monig | E05B 85/16 292/336.3 |
| 7,866,714 | B2 * | 1/2011 | Monig | E05B 81/76 292/336.3 |
| 8,307,516 | B2 * | 11/2012 | Bartnick | B60N 3/023 16/110.1 |

FOREIGN PATENT DOCUMENTS

| | | | | |
|---|---|---|---|---|
| EP | 0900691 A2 * | 3/1999 | | B60N 3/023 |
| JP | 2001-032579 A | 2/2001 | | |
| JP | 2007-177521 A | 7/2007 | | |
| KR | 10-0490368 B1 | 5/2005 | | |
| KR | 1020130064380 A | 6/2013 | | |

\* cited by examiner

ASSIST HANDLE FOR VEHICLE

CROSS-REFERENCE TO RELATED APPLICATION

The present application claims priority to Korean Patent Application No. 10-2013-0084392 filed Jul. 17, 2013, the entire contents of which is incorporated herein for all purposes by this reference.

BACKGROUND OF THE INVENTION

Field of the Invention

The present invention relates to an assist handle for a vehicle. More particularly, the present invention relates to an assist handle for a vehicle which reduces noise due to a return shock by decreasing the return speed of a handgrip.

Description of Related Art

In general, automotive assist handles are mounted on the head lining in a vehicle so that passengers can hold them with hands to keep the balance of their bodies.

Automotive assist handles are provided with both ends of the handgrips rotatably fastened by hinge pins to both ends of mounting plates fastened to the head lining in a vehicle.

Such an automotive assist handle is elastically supported at an upper portion with the handgrip in contact with the head lining in the normal state, and when a passenger holds the handgrip, the handgrip pivots down at a predetermined angle and keeps held by the passenger at the fixed position.

The automotive assist handles of the related art are provided with a damping structure to suppress shock noise and control the return speed of the handgrips, when the handgrips are operated and returned.

However, damping structures of the related art deform due to a physical limit (abrasion resistance and heat resistance) because dampers made of rubber are used, such that they cannot suppress shock noise due to operation and return of handgrips.

Further, since there is no factor that controls the return speed of handgrips, emotional quality reduces.

Further, oil dampers are used to solve the problems, but the oil dampers are expensive than the rubber dampers and the commercial quality is low.

The above information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an assist handle for a vehicle having advantages of reducing shock noise by controlling the return speed of the handgrip, using a friction force between a damper inserted in one mounting plate and a hinge pins rotating with the handgrip. An assist handle for a vehicle may have a secondary damping function by reducing shock due to operation and return of the handgrip, using a stopper formed at the damping end of the damper and inside the handgrip.

In an aspect of the present invention, an assist handle apparatus for a vehicle in which first and second ends of a handgrip are hingedly mounted on a head lining through first and second mounting plates, the first mounting plate positioned at a first side of the handgrip and including a return spring to provide a return force to the handgrip, and the second mounting plate positioned at a second side of the handgrip and including a damping mechanism to absorb a return shock force, wherein the damping mechanism may include a hinge pin connected to the handgrip, hinge ends positioned at first and second sides of the second mounting plate, wherein a damper seat is formed in a space defined between the hinge ends, a damper that is inserted in the damper seat with the hinge pin passing through the damper and the hinge ends, the damper having first and second damping ends protruding at a first side and a second side of an outer circumference of the damper respectively, and a stopper that is formed on an inner side of a hinge portion of the handgrip, wherein the stopper damps rotation shock in both rotation directions of the handgrip when the stopper selectively contacts with the first damping end or the second damping end according to rotation of the handgrip.

In the damper, the first and second damping ends are supported between both first and second inner sides of the damper seat.

The damper is made of rubber and may have a pin hole into which the hinge pin is forcibly fitted.

A return rotation speed of the hinge pin is reduced by a friction between the damper and the hinge pin integrally rotating with the handgrip.

The stopper may have both first and second sides formed in a rotational direction of the handgrip and damps rotation shock in both rotation directions of the handgrip by coming in contact with the corresponding first damping end or second damping end.

The stopper may have both first and second sides formed in a rotational direction of the handgrip and the first and second sides are formed at different angles to damp rotation shock in both rotation directions of the handgrip by coming in full contact with the first damping end or the second damping end.

According to the present invention, it is possible to reduce shock noise by controlling the return speed of the handgrip, using a friction force between a damper inserted in one mounting plate and a hinge pints rotating with the handgrip.

Further, the operation and return shock of the handgrip is reduced by the damping ends of the damper and the stopper on the inner side of the handgrip, such that secondary damping is performed and emotional quality for a user is improved. In addition, since the damper made of rubber is used, the manufacturing cost can be reduced and the commercial value can be improved.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
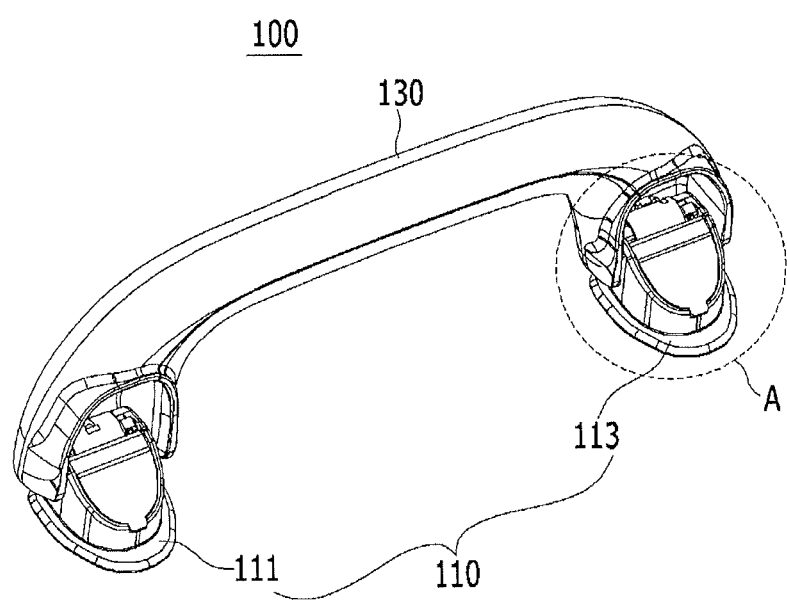
FIG. 1 is a projective perspective view showing an assist handle for a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described with reference to the accompanying drawings so that those skilled in the Field of the Invention to which the present invention pertains may carry out the exemplary embodiment.

FIG. 1 is a projective perspective view showing an assist handle for a vehicle according to an exemplary embodiment of the present invention.

Referring to FIG. 1, an assist handle 100 for a vehicle may be mounted on a head lining such that both first and second ends of the handgrip 130 operate like hinges by mounting plates 111 and 113.

In the mounting plates 111 and 113 positioned at first and second sides respectively of the handgrip 100, the mounting plate 111 at the first side may include a return spring to provide a return force to the handgrip 130.

The mounting plate 113 at the second side of the handgrip 130 may include a damping mechanism 131 (shown in FIGS. 4A and 4B), which reduces noise due to operation and return shock and improves emotional quality of the handgrip 130 by decreasing the return speed of the handgrip 130.

Figure 2:
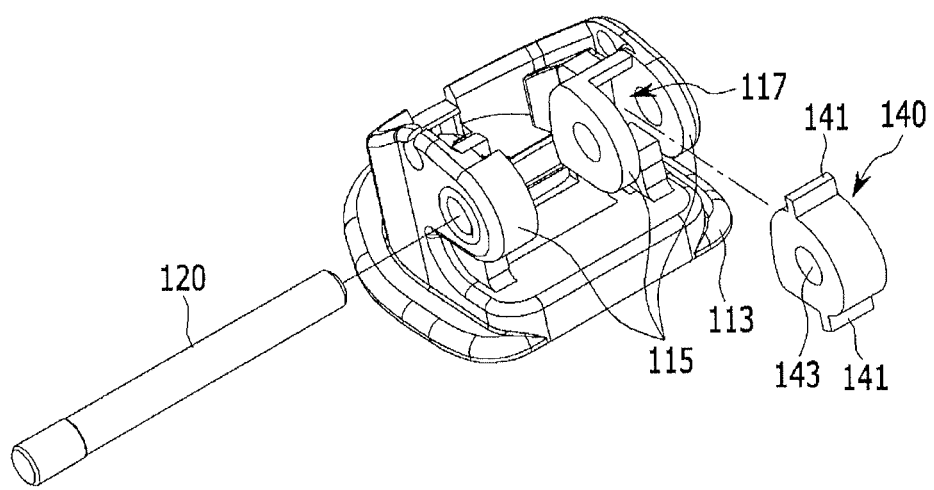
FIG. 2 is an exploded perspective view of a hinge portion A of FIG. 1 according to an exemplary embodiment of the present invention.
Figure 3A:
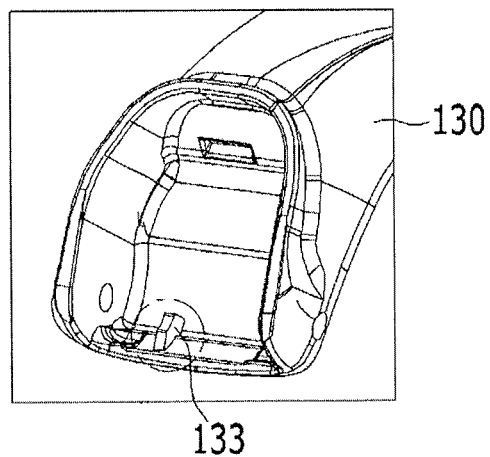
FIGS. 3A and 3B are a partial perspective views showing a handgrip that is used for the assist handle for the vehicle according to an exemplary embodiment of the present invention.
Figure 3B:
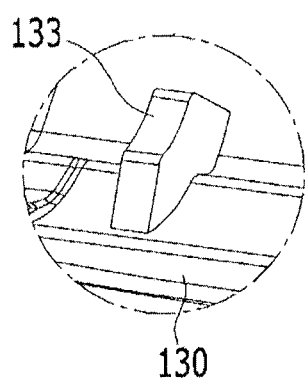

FIG. 2 is an exploded perspective view of a hinge portion A of FIG. 1 and FIGS. 3A and 3B are partial perspective views showing a handgrip that is used for an assist handle for the vehicle according to an exemplary embodiment of the present invention.

Referring to FIGS. 2, 3A and 3B, the damping mechanism 131 may include a damper seat 117, a damper 140, and a stopper 133.

The damper seat 117 may be a space defined between hinge ends 115, which are formed at both first and second sides of the mounting plate 113 and where a hinge pin 120 may be inserted.

The damper 140 may be fitted in the damper seat 117 and the hinge pin 120 integrally rotating with the handgrip 130 passes through the damper.

The damper 140 may have damping ends 141 formed at a first side and a second side of an outer circumference of the damper 140, respectively.

The damping ends 141 of the damper 140 may be supported at both first and second inner sides of the damper seat 117.

In an aspect of the present invention, the damper 140 may be made of rubber and have a pin hole 143 at the center corresponding to the rotational center of the hinge pin 120 and the hinge pin 120 may be forcibly fitted in the pin hole 143, such that the rotation speed of the hinge pin 120 integrally rotating with the handgrip 130 reduces.

That is, the rotation speed of the hinge pin 120 is reduced because the elastic return force of the damper 140 acts as a friction force against the hinge pin 120 inserted in the pin hole 143.

The stopper 133 may be formed in a rotation direction in the hinge portion A of the handgrip 130 such that both first and second sides of the stopper 133 act on the damping ends 141 to damp rotation shock in rotation directions.

Both the first and second sides of the stopper 133 may be formed at different angles to damp shock in full contact with the damping ends 141.

The operation and action of the assist handle 100 for a vehicle according to an exemplary embodiment of the present invention is described below with reference to FIGS. 4A and 4B.

Figure 4A:
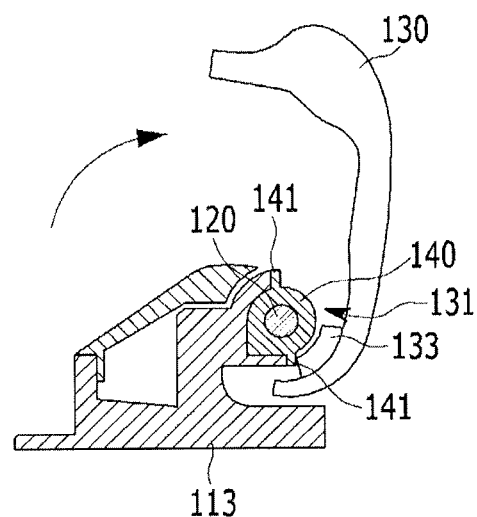
FIGS. 4A and 4B are views illustrating an operation of the assist handle for the vehicle according to an exemplary embodiment of the present invention.
Figure 4B:
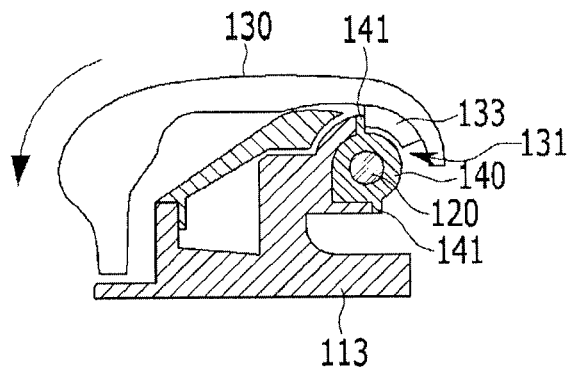

FIGS. 4A and 4B are views illustrating an operation of the assist handle for the vehicle according to an exemplary embodiment of the present invention.

Referring to FIGS. 4A and 4B, in the assist handle 100 for a vehicle, as a passenger rotates the handgrip 130 to operate it, the first side of the stopper 133 may come in full contact with the damping end 141 at the first side of the outer surface of the damper 140, such that shock due to the operation of the handgrip 130 is attenuated, thereby preventing noise.

The damper 140 does not rotate with the hinge pin 120 because the damping ends 141 may be supported on the first and second sides inner sides of the damper seat 117.

When the passenger takes a hand off the hand grip 130, the hand grip 130 is returned by the return spring of the mounting plate 111.

The return speed of the handgrip 130 is reduced by the friction force between the hinge pin 120 rotating with the handgrip 130 and the damper 140, and the second side of the stopper 133 comes in full contact with the damping end 141 at the second side of the outer circumference of the damper 140, such that shock due to the return of the handgrip 130 is attenuated, thereby preventing noise.

Accordingly, when the assist handle 100 for a vehicle is used, the return speed of the handgrip 130 may be controlled by the friction force between the damper 140 in the mounting plate 113 and the hinge pin 120 rotating with the handgrip 130, such that shock noise can be reduced.

Further, the operation and return shock of the handgrip 130 may be reduced by the damping ends 141 of the damper 140 and the stopper 133 on the inner side of the hinge portion A of the handgrip 130, such that secondary damping is performed and emotional quality for a user is improved.

In addition, since the damper 140 made of rubber is used, the manufacturing cost can be reduced and the commercial value can be improved.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An assist handle apparatus for a vehicle in which first and second ends of a handgrip are hingedly mounted on a head lining through first and second mounting plates, the first mounting plate positioned at a first side of the handgrip, and the second mounting plate positioned at a second side of the handgrip and including a damping mechanism to absorb a return shock force, wherein the damping mechanism includes:

a hinge pin connected to the handgrip;

hinge ends positioned at first and second sides of the second mounting plate, wherein a damper seat is formed in a space defined between the hinge ends;

a damper inserted in the damper seat with the hinge pin passing through the damper and the hinge ends, the damper having first and second damping ends protruding at a first side and a second side of an outer circumference of the damper respectively; and a stopper formed on an inner side of a hinge portion of the handgrip, wherein the stopper damps rotation shock in both rotation directions of the handgrip when the stopper selectively contacts with the first damping end or the second damping end according to rotation of the handgrip, wherein the stopper has both first and second sides formed in a rotational direction of the handgrip and the first and second sides are formed at different angles to damp rotation shock in both rotation directions of the handgrip by coming in full contact with the first damping end or the second damping end.

2. The assist handle apparatus of claim 1, wherein, in the damper, the first and second damping ends are supported between both first and second inner sides of the damper seat.

3. The assist handle apparatus of claim 1, wherein the damper is made of rubber and has a pin hole into which the hinge pin is forcibly fitted.

4. The assist handle apparatus of claim 3, wherein a return rotation speed of the hinge pin is reduced by a friction between the damper and the hinge pin integrally rotating with the handgrip.

* * * * *